United States Patent

[11] 3,619,381

| [72] | Inventor | George R. Fitterer<br>825 Twelfth St., Oakmont, Pa. 15139 |
|------|----------|---|
| [21] | Appl. No. | 786,866 |
| [22] | Filed | Dec. 23, 1968 |
| [45] | Patented | Nov. 9, 1971<br>Continuation-in-part of application Ser. No. 570,855, Aug. 8, 1966, now abandoned. |

[54] DETERMINING OXYGEN CONTENT OF MATERIALS
9 Claims, 12 Drawing Figs.

| [52] | U.S. Cl. | 204/1 T,<br>204/195, 263/52 |
|------|----------|---|
| [51] | Int. Cl. | G01n 27/46 |
| [50] | Field of Search | 204/1.1, 195; 136/86, 153 |

[56] References Cited
UNITED STATES PATENTS

| 3,196,100 | 7/1965 | Digby | 204/195 |
|-----------|--------|-------|---------|
| 3,297,551 | 1/1967 | Alcock | 204/1.1 |
| 3,309,233 | 3/1967 | McPheeters et al. | 204/195 |
| 3,347,767 | 10/1967 | Hickam | 204/195 |
| 3,359,188 | 12/1967 | Fischer | 204/1.1 |
| 3,378,478 | 4/1968 | Kolodney et al. | 204/195 |
| 3,400,054 | 9/1968 | Ruka et al. | 204/1.1 |
| 3,403,090 | 9/1968 | Tajiri et al. | 204/195 |
| 3,404,036 | 10/1968 | Kummer et al. | 136/153 |
| 3,468,780 | 9/1969 | Fischer | 204/195 |

OTHER REFERENCES
Horsley, "AERE Report R3427," 1961, pp. 1–6 & FIG. 2

*Primary Examiner*—T. Tung
*Attorney*—Don J. Smith

ABSTRACT: A probe for use in apparatus for determining oxygen content of a material comprises an elongated envelope, a mass of solid electrolyte material supported in one end of said envelope, at least a portion of one side of said mass being exposed through a relatively small opening in said envelope for contact with said material, reference means for contacting an apposed side of said mass with an oxygen-reference material, and circuit means for electrically contacting said apposed side of said mass, said envelope being fabricated electrically insulated material.

INVENTOR
George R. Fitterer

INVENTOR
George R. Fitterer

INVENTOR
George R. Fitterer

DETERMINING OXYGEN CONTENT OF MATERIALS

This application is a continuation-in-part of my copending application entitled Method and Means for Determining Oxygen Content of Materials, Ser. No. 570,855, filed Aug. 8, 1966, now abandoned.

The present invention relates to methods and means for the direct determination of oxygen content of various materials, and more particularly to means and methods for the substantially instantaneously determination of oxygen in liquid metals and other materials maintained at elevated temperatures, for example, molten steel. Certain arrangements of the invention are adapted for use with conductive and nonconductive materials, respectively, particularly at elevated temperatures.

There are many applications throughout industry wherein it is necessary to ascertain the oxygen content of various materials. However, in order for such information to be useful in many manufacturing processes, it is essential that the oxygen analyses be timely made to permit corrective adjustment of manufacturing processes. In the aces of liquid steels and other high-temperature liquid metals, various methods have long been used for the sampling and analysis of their oxygen contents. In the manufacture of rimming steel, certain high quality steels, and other metals which are melted at high temperatures, it is essential that the quantity of oxygen or other gas dissolved in the steel be closely controlled. In various liquid metal processes, a technique of continually monitoring the dissolved oxygen content is sorely needed. In all of the analytical methods developed previously, however, it has been necessary to extract a sample of the molten steel or other liquid metal or alloy from the ladle or from the furnace as the case may be. The sample then is carried elsewhere for analysis, for example, by vacuum fusion procedures.

The analysis made in the foregoing manner is time consuming, in addition to involving considerable labor costs, and does not provide an up-to-the-minute picture or analysis of gas content in the molten material during the manufacturing process. Therefore, corrective measures have to be delayed until the analysis becomes available from the laboratory. In consequence, such corrective measures usually are ineffective or at best serve merely to provide background or post mortem information relative to succeeding heats, batches, or melts.

These difficulties are overcome by my disclosed direct-determination apparatus and methods which involve the insertion of a probe into a high-temperature material such as molten steel or other liquid metal. In the case of liquid steels or the like means are afforded for penetrating any overlying slag without affecting the reading. Upon contact with the liquid metal or other material, the probe through suitable electric circuitry yields an indication of the oxygen content substantially at the instant of insertion. In one arrangement of my apparatus liquid metal or other high-temperature material can be brought into contact with a solid electrolytic cell of specialized construction, when the probe is inserted therein. Such contact is established in a manner so as to expose the electrolytic cell to the material having an unknown oxygen content, without either oxidation or deoxidation of the sample by contact with extraneous materials. The resultant electromotive force generated by the cell when contacted with the material is found to vary in direct proportion to the dissolved or uncombined oxygen content of the molten metal. A suitable calibration can be readily established to relate oxygen content to the e.m.f. value, or the instrumentation measuring the e.m.f. can be provided with a suitable calibrated scale to indicate oxygen content directly.

In either case, the substantially instantaneous analysis of the oxygen content in the molten metal or other material at elevated temperatures is completed in a few seconds after the probe is inserted. Thus, useful manufacturing informations can be obtained even where the oxygen level is changing rapidly. On the other hand, with conventional analytical techniques the values of oxygen content, even if accurate, would be useless insofar as that particular batch or heat would be concerned.

Most importantly, my apparatus is capable of being plunged into molten steel or other materials maintained at extremely high temperatures. A measurement of the dissolved oxygen content, is obtained, owing to the novel construction of my apparatus, at a predetermined point or location within the bath of molten steel or the like. Previous apparatus for this purpose have been subject to fracturing or other thermal shock when plunged into molten steel. Prior oxygen measuring devices which included an elongated electrolyte tube, tend to measure the highest oxygen concentration at an indeterminate point along the length of the probe. The presence of an overlying layer of slag, or other foreign material, usually distorted the reading obtained with known direct-measurement apparatus.

The structural and technical disadvantages of the prior art which have been noted during the preceding discussion are illustrated by the U.S. Pats. to Hickam No. 3,347,767; Alcock No. 3,297,551; McPheeters et al. No. 3,309,233; Kolodney et al. No. 3,378,478; and Fischer No. 3,359,188. Each of these patents contemplates the provision of an elongated tube made from a solid electrolyte material. This representative sampling of the prior art emphasizes the inability of prior devices to measure the dissolved oxygen content at a predetermined location within the material. That the relatively large electrolyte tube is subject to thermal shock is abundantly illustrated by Kolodney et al. who provides a surrounding mesh basket for collecting pieces of the electrolyte tube upon fragmentation. These references further represent the difficulty of suitably insulating the walls of the electrolyte tube from its holder to prevent shorts in the electric circuit.

My apparatus, on the other hand, employs a probe using a relatively small mass of solid electrolyte, supported in the end of an elongated, insulating tube. The assembly thus formed is highly resistant to thermal shock, and only a very small area of the electrolyte is exposed to the material being measured. A further advantage arises from confining the measurement to a very small, predetermined point or area within the heat or melt.

A number of laboratory instruments for the direct measurement of oxygen have also been proposed from time to time. These are typified by Horsley, AERA Report R3427 pp. 1–6 and FIG. 2, 1961. An electrolyte disc is sandwiched between two cermet electrodes for the purpose of measuring the free energy in the cermets. The sandwich is held together by a pair of tubes, an additional purpose of each of which is to supply a controlled, inert atmosphere respectively to the outward surfaces of the cermets. Further, the cermet discs are separated from the supporting tubes by nickel discs or foils. If the lower supporting tube of the Horsley device were removed, the entire assembly would, of course, fall apart. Obviously, there is no teaching of submerging the Horsley device in a liquid material particularly in a high-temperature liquid material. Similarly, there is no teaching of securing a small mass or pellet of solid electrolyte material in the end of supporting and insulating tube.

Similar apparatus for the direct measurement of oxygen is described in the literature, representative references to which are tabulated below:

1. K. Kiukkola and C. Wagner: J. Electrochemical Soc., 104, 397, 1957.
2. H. Schmalzried: Z. f. Physicalische Chemie NF, 25, 178, 1960.
3. C. B. Alcock and T. N. Belford, Trans. Faraday Soc. 60, 822, 1964.
4. W. Pluschkell and H. Engel: J. Metallkunde, 56, (7), 450, 1965.
5. W. A. Fisher and W. Ackermann: Arch. f.d. Eisenhuttenw 36, 643, 1965.
6. M. Kolodney, B. Minushkin, and H. Steimnetz: Electrochem. Tech, 3, (9–10), 244, 1965.
7. Y. Matsushita and Goto: Thermodynamics IAEA (Vienna) 1, 1966.
8. T. C. Wilder: Trans Met. Soc. AIME, 236, 1035, 1966.
9. R. Baker and J. M. West: J. British Iron & Steel Inst., 204, 212, 1966.

10. E. T. Turkdogen and R. E. Fruehan: 76th General Meeting AISI, May 1968.

In certain forms of my novel direct measurement apparatus the probe structure can be enclosed with a self-contained oxygen-based reference material therein. This avoids the necessity of conducting air or other oxygen-containing material into the probe structure from an external source during use of the probe.

I accomplish the desirable results described heretofore and overcome the defects of the prior art by providing a probe for use in apparatus for determining oxygen content of a material, said probe comprising an elongated envelope, a relatively small mass of solid electrolyte material supported in one end of said envelope, at least a portion of one side of said mass being exposed through a relatively small opening in said envelope for contact with said material, reference means for contacting an apposed side of said mass with an oxygen-reference material, and circuit means extending through said envelope for electrically contacting said apposed side of said mass, said envelope being fabricated from an electrically insulated material.

I also desirably provide a similar probe wherein said insulating material has a melting point within a sintering range of said electrolyte material so that said mass is sealed to said envelope by a sintering action upon heating said mass and at least an adjacent portion of said envelope to a temperature approximating its melting temperature.

I also desirably provide a similar probe wherein particles of said mass in addition are sintered to one another upon said heating of said envelope.

I also desirably provide a similar probe wherein the walls of said envelope are heat formed about said mass.

I also desirably provide a similar probe wherein said reference means include means in said envelope for conducting an oxygen-bearing gas to the apposed side of said mass.

I also desirably provide a similar probe wherein said reference means are enclosed within said envelope.

I also desirably provide a similar probe structure wherein said probe and an external electrode therefor are inserted through a wall structure of a refractory mold for containing a quantity of said material at an elevated temperature.

I also desirably provide an apparatus for monitoring oxygen content of a liquid material comprising a container having an outlet opening in a bottom wall thereof for said material, an annular insert for said opening, said insert being fabricated from a solid electrolyte material and having a throat passage extended therethrough for passage of said material, means for contacting said insert with an oxygen reference material at a point removed from said throat passage, and circuit means for establishing electrical contact with said insert throat passage and with said removed point respectively.

These and other objects, features and advantages of the invention, together with structural details thereof, will be elaborated upon as the following description of presently preferred embodiments and presently preferred methods of practicing the same proceeds.

In the accompanying drawings, I have shown presently preferred embodiments of the invention and have illustrated presently preferred methods of practicing the same, wherein:

FIG. 10 is a partial cross-sectional view of still another form of my direct oxygen measuring apparatus shown in a unique arrangement with a continuous casting machine or the like;

Figure 1:
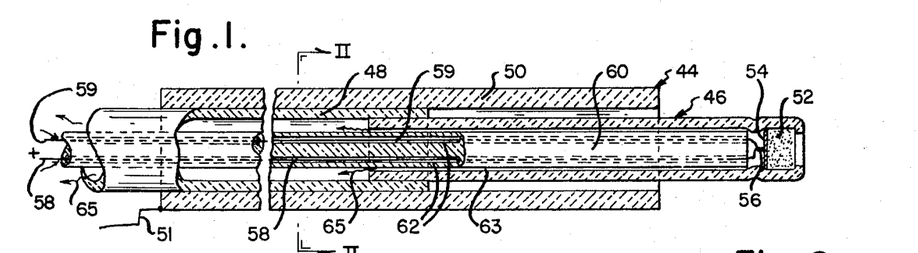
FIG. 1 is a longitudinally sectioned view of one form of probe structure arranged in accordance with the invention.
Figure 2:
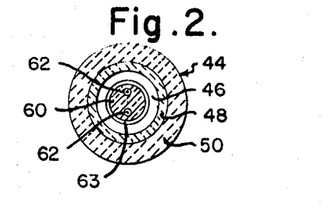
FIG. 2 is a cross-sectional view of the probe structure shown in FIG. 1 and taken along reference line II-II thereof.

Referring now to FIGS. 1-2 of the drawings, the illustrative form of the probe structure 44 shown therein includes an envelope 46 fabricated from glass, fused silica, or fused quartz or the like electrically insulating material which is sufficiently refractory and chemically resistant to withstand molten metal or other high-temperature material for an interval at least sufficient to permit a reading to be made. In the case of molten steel analyses, fused silica or quartz is preferred. Fused silica has a melting point of about 1710° C. and begins to soften at about 1650° C., which is higher than that of liquid steels. In any event, slight softening of the envelope 46, does not interfere with the reading, which is substantially instantaneous.

The envelope 46 in this example is retained in a length of iron tubing 48 or other suitable support, on the outer surface of which is supported an electrode 50, which is fabricated from an electrically conductive material capable of withstanding molten metal at elevated temperatures. The electrode 50, if desired, can be separated from the probe structure for independent insertion into the liquid metal. In any event the electrode 50 can be shaped for coinsertion with the probe 44 to a predetermined depth in the liquid metal. Examples of such coinsertion are evident from FIGS. 9, 11, 12 described below.

At the other end of the envelope 46 a mass 52 of solid electrolytic material, such as one of the solid electrolytes tabulated below, is retained as by melting or heat-forming the walls of the envelope 46 about the mass 52. For operation of the probe, it is necessary only that the mass 52 be sealed to the envelope 46, to an extent to prevent leakage of liquid metal into or gas out of the probe. In this example, a very reliable seal is produced as by heat-forming the envelope material about the mass 52. Heat-forming of the envelope can be accomplished by spinning the envelope while heating at least that portion thereof adjacent the mass 52 to the softening point of the envelope material.

The seal results from a sintering action which inherently occurs when solid electrolyte and envelope materials of comparable sintering and softening temperature ranges are employed. For example a zirconia-calcia mass 52 (or an electrolyte of similar melting point such as yttria stabilized thoria) has a sintering temperature range of about 2300° F. to 3250° F. and is inherently sintered to a fused silica envelope having a softening point of about 3000–3100° F. Sintering occurs between the electrolyte mass 52 and the adjacent surface of the silica envelope to form an excellent ceramic-to-ceramic seal. In addition, individual particles of the mass 52 are sintered or resintered, as the case may be, to one another for increased strength and reduced porosity of the electrolyte mass 52. The probe 44 is highly resistant to thermal shock, and its reading is confined to the very small area of liquid metal or other material contacted by the exposed surface of the mass 52.

In one arrangement, the mass 52 can be provided in the form of a discrete pellet or disc to which the walls of the envelope 46 can be shaped thereabout, as shown in Fig. 1; or alternatively the pellet can be inserted into a length of tubing 46' (FIG. 3) made of the aforementioned insulating materials and having about the same inner diameter as the outer diameter of the mass 52'. In the latter case the adjacent wall positions of the envelope 46' can be heat-formed and spun upon the outer cylindrical periphery of the pellet 52' to form a seal therewith, as noted above.

In another arrangement the mass 52 can be inserted as a paste of pulverulent solid electrolyte material in a suitable binder or agglutinant material.

Figure 10:
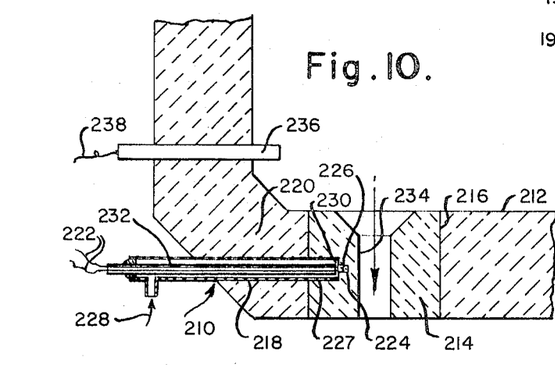

In forming a powdered zirconia-containing electrolyte into a special shape, such as the mass or disc 52 in the end of the envelope 48, or other structure, such as the electrolyte insert of FIG. 10, I convert the powder into a paste or plastic mass by mixing it with certain agglutinants. Certain polymers, such as polyvinyl alcohol, carboxy methylcellulose and/or gum gatti in an aqueous solution, can be used for this purpose.

For the noted envelope materials and for materials of comparable softening and sintering points, the bit of paste and the envelope desirably are slowly heated to about 2000° F. to drive off the binder, and then fired at maximum temperature of about 3000° F. to sinter the thus compacted mass 52 to the envelope and its particles to one another.

Figure 3:
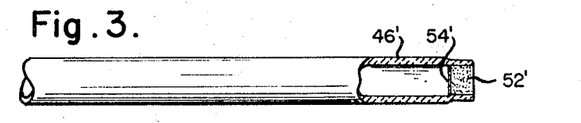
FIG. 3 is an enlarged elevational view, partially sectioned, of one form of the insulating envelope and electrolyte pellet arrangement which can be utilized in the probe structures of FIGS. 2 and 4.

The envelope 46 or 46', together with the mass 52 or 52', is releasably held in the probe structure 44 so that the envelope and pellet can be discarded, where required, after one or more measurements. When using the probe 44 the forward surface of the mass 52 is exposed to the molten material through the otherwise open end of the envelope 46.

Oxygen from suitable oxygen-reference means such as those described below, diffuses readily through the electrode coating or member. In the case of pure iron, for example, reference oxygen quickly saturates the iron foil or casting, before an oxidation commences. In other arrangements of my invention the coating is provided as a piece of foil or other discreet member pressed or held against the mass 52 for contact purposes. Reference oxygen can then pass around as well as through the contact member.

Although the coating 54 facilitates intimate contact between the mass 52 and an electrical connection such as thermocouple 56, the coating is not essential as pointed out below. The thermocouple 56, in this example, also provides an electrical connection to the opposite or other apposed surface of the mass 52 through one of its leads, for example, the lead 58. The other electrical connection can be provided by lead 51 and electrode 50, since the envelope 46 is of insulating material.

The thermocouple leads 58 and 59 are insulated and conducted through the envelope 46 to the thermocouple 56 by suitable means such as an apertured and elongated insulating member 60, fabricated from fused silica, alumina or the like. The insulating member 60 desirably is spacedly fitted within the envelope 46, and is provided with a pair of longitudinally extending, laterally spaced apertures 62 through which the thermocouple leads 58, 59 are loosely extended. The passages 62 therefore can provide access for external air or other oxygen-containing gas to the thermocouple side of the electrolyte disc 52. Desirably the member 60 presses the thermocouple 56 into good electrical and thermal contact with the mass 52. In this relation, the member 60 can be affixed after the teaching of FIG. 8, for example.

Other oxygen-containing materials such as $CO_2$ or various cermets, (and many other oxygen-bearing compounds some of which are noted hereinafter) can be used as oxygen-reference means. These materials dissociate at the elevated temperatures to which the probe usually is subjected as follows:

$$CO_2 \rightleftharpoons CO + \frac{1}{2} O_2$$
$$Cr_2O_3 \rightleftharpoons 2 Cr + 3/2 O_2$$
$$NiO \rightleftharpoons Ni + \frac{1}{2} O_2$$

As such compounds have differing dissociation energies, the probe usually requires calibration for each such source of oxygen.

The aforementioned reference gas can be circulated inwardly through the rod apertures 62 to the inner surface of the pellet 52 and then outwardly through clearances 63 between the rod 60 and the envelope 46 as denoted by the flow arrows 65. On the other hand, the rod 60 can be closely fitted within the envelope 46 and a central longitudinally extending baffle (not shown) can be utilized to circulate a reference gas forwardly through one of the passages 62 and in the return direction through the other passage 62.

Figure 6:
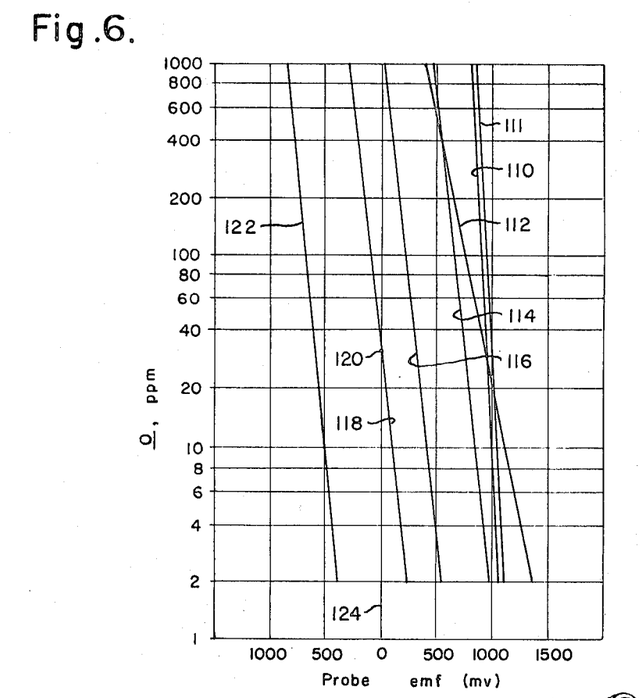
FIG. 6 is a graphical representation of the calibrated electrical output of my novel probe utilizing various types of oxygen-reference materials.

It has been found that ready access of the inner surface of the solid electrolyte disc 52 to a standard oxygen-reference source is necessary in order to obtain a prompt reading of stabilized e.m.f. output from the probe, when the molten material contacts both the mass 52 and the electrode 50. In one arrangement of my oxygen-reference means, a steady but not necessarily strong flow of reference gas is thus maintained. It is contemplated that the quantity or concentration of oxygen available from the oxygen-reference means can be varied as noted below or by adding a quantity of nitrogen or other relatively inert gas, so as to shift the calibration curve of the electrolyte cell to another, more easily measured potential range (FIG. 6).

It will be understood, of course, that the use of the thermocouple 56, and one of its leads, such as the lead 59, are not essential to the operation of the probe structure 44 and can be omitted, particularly if other temperature measuring means are available. The aforementioned electrically conductive coating 54 is not essential, but is useful in facilitating electrical contact with the lead or leads 58, 59 by pressure contact for example. Also, one of the gas and conductor passages 62 can likewise be omitted and the aforementioned circulation of oxygen-bearing gas can be returned through the clearances 63. The leads can be of very small diameter, so as not to obstruct the flow of an oxygen-reference gas, when used.

The mass 52 is sufficiently small, in this example, that any differential expansion between the solid electrolyte material comprising the mass 52 and the material of the envelope 46 will not cause the latter to fracture. In fact, the small size of the probe structure does not interfere with electro-chemical aspects of its operation, and the probe can be "miniaturized," if desired, to an extent consistent with manufacturing techniques.

A further advantage of the structure of FIGS. 1–3 lies in the fact that the size and shape of mass 52 considerably reduces the cost of manufacturing the probe structure 44 as compared to the case where the entire envelope 46 or a substantial portion thereof is fabricated from the solid electrolyte, which is a rather expensive material. The latter advantage is an important consideration in view of the fact that the electrolyte mass 52 and the envelope 46 in many applications must be replaced in the probe structure 44 after each reading particularly after insertion into high temperature liquid metals, such as molten steel. The expendable envelope 46 and mass 52 together represent a small fraction of the cost of fabricating the entire envelope from an electrolyte material. The latter envelope, even if it does not fracture from thermal shock, must also be expended after each use, which renders the cost thereof prohibitive for most applications.

Figures 4, 5:
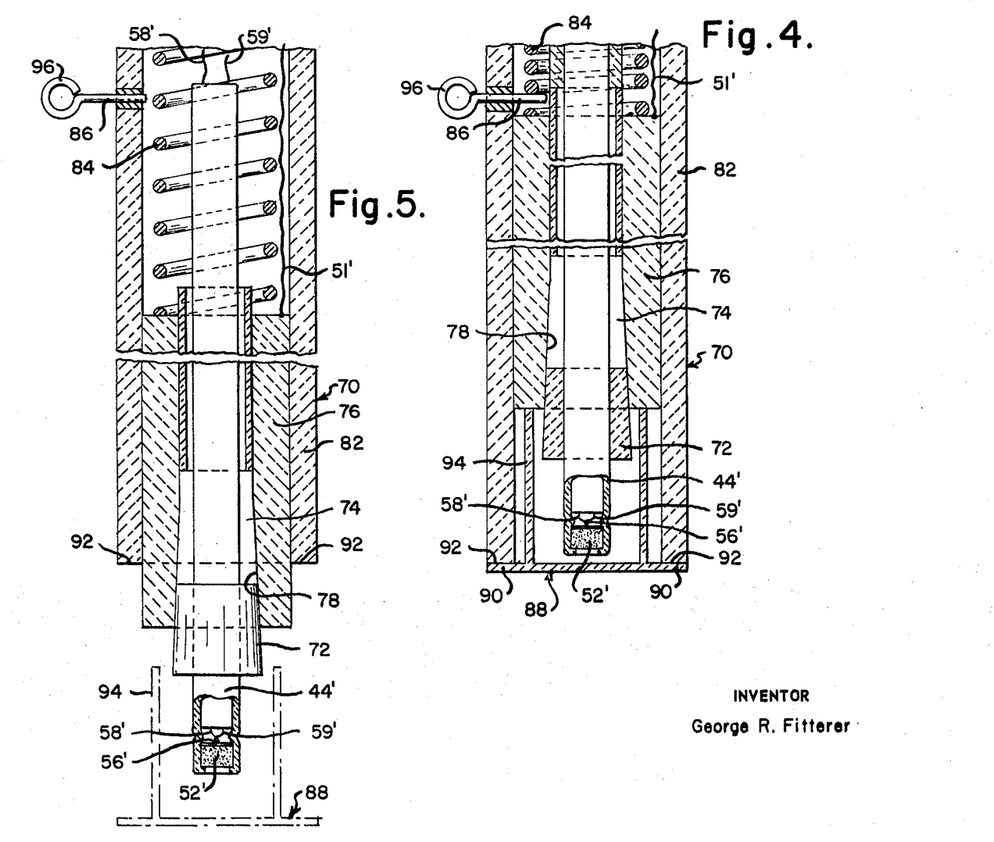
FIG. 4 is a partial longitudinally sectioned view of another form of probe structure arranged in accordance with the invention.
FIG. 5 is a partial longitudinally sectioned view of the probe structure of FIG. 4 and showing the probe structure in its extended, operative position with reference to the molten material being analyzed.

Referring now to FIGS. 4 and 5 of the drawings, wherein similar reference characters with primed accents denote similar components of FIGS. 1 and 2, another probe structure 70, arranged in accordance with the invention, is illustrated. The latter arrangement is adapted particularly for determining oxygen content of a liquid metal in most refining furnaces, such as the open hearth, where it is necessary to protect the probe from contact with an overlying layer of molten slag thereon as the probe is immersed below the slag metal interface. Thus, the probe structure 70 is provided with means for shielding the solid electrolyte from contact with the overlying slag layer and for quickly inserting the probe components into the molten bath in order to obtain a stabilized reading.

In furtherance of these purposes the supporting envelope 44' together with the electrolyte mass 52' secured therewith are mounted in a plug member 72, through which the envelope 44' is extended centrally and longitudinally. The plug 72 is inserted into a central and longitudinally extending channel 74 of a tubular electrode 76. Electrical contact to the tubular electrode 76 and to the electrolyte disc 52' is established by lead 51' and one of the thermocouple leads 58' and 59' as described above in connection with FIGS. 4 and 5. An oxygen reference gas, such as air or $CO_2$, can be circulated to the inner surface of the disc 52' and/or the thermocouple 56' can be eliminated as described previously with reference to FIGS. 4 and 5.

The tubular electrode 76 and the components of the probe structure 70 supported thereby, are slidably mounted within an outer supporting tube 82. The tubular electrode 76 is thus mounted for movement longitudinally of the outer support tube 82, and in this example is secured to the adjacent end of a compressed resilient member such as a coil spring 84. The spring 84 is maintained in its compressed condition in this example by a pin 86 inserted through a suitable aperture in the support tube 82 and movable laterally to restrain and to release the compressed spring 84, as required. In the probe structure 70 as shown in FIG. 4 the pin 86 engages the next to the last helix of the coil spring 84 to maintain the major proportion of the spring 84 in its compressed condition and the tubular electrode 76 and associated components in their inoperative position in the outer support 82.

In this position the insertable ends of the tubular electrode 76 and of the envelope 44' and disc 52' are covered by a removable cap 88, which can be frictionally or otherwise detachably secured to the adjacent end of the outer support tube 82 by suitable quick fastening means (not shown) secured to the outer flange 90 of the cap and the adjacent end 92 of the support tube 82. The inward end of tubular portion 94 of the cap 88 is of sufficient length to engage the adjacent end of the tubular electrode 76, in this position.

In the operation of the probe structure 70 the lower end of the support tube 82, as viewed in the drawings, is inserted through any overlying slag and well into the molten steel or other material to be analyzed. The pin 86 is then withdrawn, for example by means of its eye-hook 96 to release the ejection spring 84. The slidably mounted tubular electrode 76 carrying with it the envelope 44' and electrolyte disc 52' and the detachable cap 88, is then ejected downwardly farther into the molten steel or other liquid metal, where it comes to rest at the extended position of the ejection spring 84 as shown in FIG. 5 of the drawings. The inserted movement of the probe forces the protective metal cap 88 into the metal where it dissolves or falls away to allow normal use of the probe. While in place, the cap 88 prevents contact of the molten slag and concomitant erroneous readings caused by coating of the slag on the ejected components of the probe structure 70. At the fully extended position of the probe structure (FIG. 4) the relatively small exterior surface of the solid electrolyte disc 52' and the tubular electrode 76 thereto are exposed to the substance being measured at a predetermined depth.

The electrolyte mass 52 or 52' desirably is fabricated from a suitable solid material which resists melting at any anticipated elevated temperature and exhibits solid electrolytic properties. In those applications involving the testing of molten steel, where high oxygen content with relatively low percentages of carbon, silicon, and alloying constituents are anticipated, the electrolyte mass can be made zirconia stabilized with calcia, as noted above. In applications involving other high-melting liquid metals, stabilized zirconia or thoria, for example, can be used to advantage.

In general, combination of oxides can be utilized which exhibit electrolytic properties by providing the necessary defects in the crystalline lattice which allow the transport of oxygen ions. Principal among these are partially saturated complex oxides, which otherwise conform generally to the spinel-type crystalline structure. The unsaturated spinel structures, for this purpose, are approximately by the general formula ($MN_2O_4$), which results from at least three different combinations of complexing oxides. The most common process involves the combination of a monoxide with a sesquioxide, such as MgO plus $Al_2O_3$ yielding an unsaturated $MgAl_2O_4$, when combined in nonstoichiometric amounts as described below, other complexing procedures involve a dioxide and two molecules of monoxide, such as $2CaO+ZrO_2 \rightleftharpoons ZrCa_2O_4$; and a trioxide with a suboxide for example $Cu_2O+WO_3 \rightleftharpoons WCu_2O_4$. It will be seen that substantially the same molecular structure results regardless of the particular forms of oxides involved. All of these spinels therefore exhibit similarly unsaturated crystalline structures and have similar properties, including very high melting points.

There are large numbers of other oxide complexes which fall into one of the types of oxide complexes noted above and which form spinel-type molecular structures. Some of these are noted in the following table:

TABLE 1.—TYPES OF SPINELS

| Type I | | Type II | | Type III |
|---|---|---|---|---|
| $MO \cdot N_2O_3$ or $MN_2O_4$ | | $2MO \cdot NO_2$ or $NM_2O_4$ | | $M_2O \cdot NO_3$ or $NM_2O_4$ |
| $MgAl_2O_4$* | $FeCr_2O_4$* | $TiMg_2O_4$ | $TaFe_2O_4$ | $MoCu_2O_4$ |
| $MgCr_2O_4$ | $NiCr_2O_4$* | $ZrMg_2O_4$ | $ZrNi_2O_4$ | $WCu_2O_4$ |
| $MgFe_2O_4$* | $CuCr_2O_4$ | $CbMg_2O_4$ | $ZrNi_2O_4$ | |
| $CaAl_2O_4$ | $ZnCr_2O_4$* | $TaMg_2O_4$ | $TaNi_2O_4$ | |
| $MnAl_2O_4$* | $CbCr_2O_4$ | $TiCa_2O_4$ | $CbZn_2O_4$ | $MoAg_2O_4$* |
| $FeAl_2O_4$* | $CdCr_2O_4$ | $ZrCa_2O_4$ | $TaZn_2O_4$ | $WAg_2O_4$ |
| $CoAl_2O_4$* | $CoFe_2O_4$* | $CbCa_2O_4$ | $ZrCb_2O_4$ | |
| $NiAl_2O_4$* | $MnFe_2O_4$* | $TaCa_2O_4$ | $ZnCd_2O_4$ | |
| $ZnAl_2O_4$* | $FeFe_2O_4$ | $TiMn_2O_4$ | $TaCb_2O_4$ | |
| $CbAl_2O_4$ | $NiFe_2O_4$* | $TiFe_2O_4$ | $TaCd_2C_4$ | |
| $CdAl_2O_4$ | $ZnFe_2O_4$* | $TiNi_2O_4$ | $UMg_2O_4$ | |
| $CaCr_2O_4$ | $MgV_2O_4$* | $TiCb_2O_4$ | $UCa_2O_4$ | |
| $CaFe_2O_4$* | $FeV_2O_4$ | $TiCd_2O_4$ | $UMn_2O_4$ | |
| $CoCr_2O_4$* | $ZnV_2O_4$ | $TiCo_2O_4$ | $UFe_2O_4$ | |
| $MnCr_2O_4$* | | $TiZn_2O_4$ | $UNi_2O_4$ | |
| | | $ZrMn_2O_4$ | $UZn_2O_4$ | |
| | | $CbMn_2O_4$ | $UCb_2O_4$ | |
| | | $TaMn_2O_4$ | $UCd_2O_4$ | |
| | | $ZrFe_2O_4$ | $VMg_2O_4$ | |
| | | $CbFe_2O_4$ | $VZn_2O_4$ | |

However, in order to be used for solid electrolytes one of the constituent oxides must be present in less than the stoichiometric amount to permit the formation of the ion transport defects in the crystalline lattice. For example, in the monoxide-dioxide spinel formation, such as $ZrCa_2O_4$, 15 mol percent of calcium oxide rather than the theoretical 66 percent is used, to produce an unsaturated spinel lattice. The unsaturating percentage of the stabilizing oxide will, of course, vary depending upon the particular oxide complex which is used.

Complex oxide combinations can be employed other than typically spinel-type structures. For example an oxide complex formed from a dioxide and a sesquioxide, such as $ThO_2+Y_2O_3 \rightleftharpoons ThY_2O_5$, exhibits electrolytic properties in the nonstoichiometric condition. The essential requirement of the electrolytic complex oxide combination is that one of the complexing oxides be present in an nonstoichiometric amount to provide the necessary crystalline lattice defect and resulting oxygen ion transference. By this mechanism the unsaturated oxide complex from which the mass 52 or 52' is formed, develops an e.m.f. equivalent to the differential in oxygen concentration at the apposed sides or surfaces thereof. A suitable meter can be calibrated to read the e.m.f. output of the probe in terms of oxygen concentrations in the material whose oxygen content is unknown, at one side of the mass. Such calibration of course will be related to a given known oxygen concentration at the other mass side. If desired, the meter can be provided with several calibrated scales of different concentration ranges and corresponding to different known or standard oxygen concentrations.

FIG. 6 of the drawings is a logarithmic graph showing the variation of probe e.m.f. in millivolts which concentration of dissolved oxygen in parts per million. The illustrated curves, for various types of oxygen-reference materials were obtained in molten steel at 2900° F. The least desirable of these reference materials is air, as denoted by curve 110, which exhibits little change in generated e.m.f. from a concentration of 2 to 1000 p.p.m. of oxygen. Curve 112, representing the use o $CO_2$ is of special interest, on the other hand, owing to its substantially greater slope.

Figure 8:
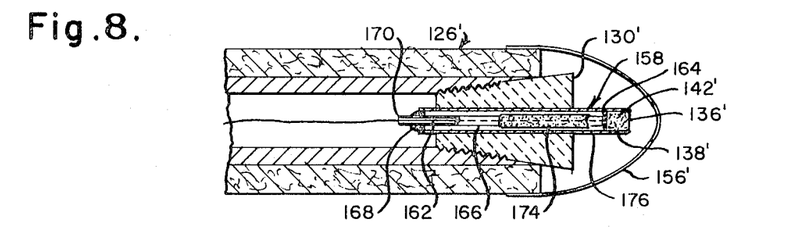
FIG. 8 is a similar view showing still another form of my novel probe structure with self-contained oxygen-reference means in a partially sealed probe structure.

Except as provided by my invention, the use of $CO_2$ or other gaseous material as an oxygen reference entails the continuous circulation of the gas through the probe structure. I avoid such continuous circulation while preserving the advantage of a higher $$\frac{\Delta EMF}{\Delta O}$$

characteristic from the use of a $CO_2$ reference, with the self-contained feature of FIG. 8 or described below.

A number of cermetlike materials for example Ni–NiO, Fe–$Fe_xO$, Cr–$Cr_2O_3$, W–$WO_2$, Co–CoO, Cb–$CbO_2$, Mo–$MoO_2$, and various other oxidizable metals and their oxides have been proposed for use with known solid electrolyte structures. These cermets, which desirably contain a preponderance of free metal for the purposes of the present invention, are especially advantageous when used in my novel probe structure, as their electrical conductivities permit electrical contact with the mass 52 therethrough. To qualify for such usage, the cermet including the free metal and its oxide must be sufficiently refractory at the anticipated operating temperature range of the liquid metal or other material to be measured. There must be no undue vaporization of the oxide but there must be a discernible equilibrium oxygen-pressure at the operating temperature range.

The e.m.f.'s obtained with some of these materials are represented by curves 114, 116 and 118. The Ni–NiO and Fe–$Fe_xO$ curves 114, 116 are satisfactory for certain applications. However, the Cr–$Cr_2O_3$ curve 118 crosses the zero e.m.f. line at point 120 with the result that concentrations of dissolved oxygen in the range of 20–50 p.p.m. are very difficult to measure. These and other oxygen-reference materials can be utilized, including the disclosed oxygen-reference means described below.

I have found that the addition of a dissimilar metal to the aforementioned cermetlike materials displaces the e.m.f. curve, as typified by curve 122 for the oxygen-reference material, NiCr–$Cr_2O_3$. This material which is a combination of nichrome and chromium oxide displaces the undesirable curve 118 to the left and away from the zero e.m.f. line 124. The curve 122 has the additional advantage that the e.m.f. varies directly with dissolved oxygen concentration. The calibrational curves of the other cermet materials can be similarly displaced. It appears that a more noble metal shifts the e.m.f. curve as a function of the activity of the diluent metal.

Figure 7:
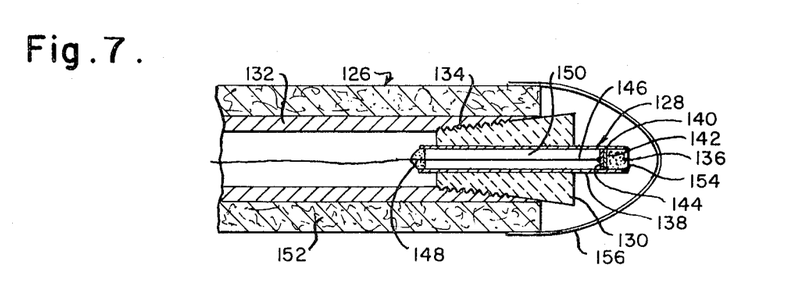
FIG. 7 is a partial, longitudinally sectioned view of still another form of my novel probe structure having self-contained oxygen-reference means.

In FIG. 7 of the drawings another arrangement 126 of my novel direct measurement apparatus is shown. In this example oxygen measuring probe 128 is inserted through a refractory holder 130. The probe 128 and the block 130 are supported by a length of steel or other metal tubing 132. A small mass of solid electrolyte 136 is sealed into an insulating tube 128 of the probe structure 138 by one of the methods described above.

A piece of relatively pure foil 140 of an oxidizable metal is supported against the inner surface 142 of the electrolyte 136, with electrical contact being made with a length of conductive wire 146 which can be made of platinum. The wire 146 is supported at the other end of the insulating tube 138 by means of refractory cement 148. If desired, a suitable insulating tube, as in FIG. 8, can be used to press the wire 146 against a contact foil 144 if used and the foil 140 or similar metallic member and in turn against the adjacent surface 142 of the electrolyte 146. I have found that such pressure is sufficient to establish proper electrical contact between the lead 146 and the solid electrolyte 136.

The small bit of an oxidizable metal 140 such as iron, chromium, nickel, cobalt, molybdenum, tungsten or columbium, provides the oxygen based reference material for the proper operation of the electrolyte cell. Thus, a small amount of air or other form of gaseous oxygen contained within the interior 150 of the probe 128, is sufficient to form a very thin layer of $Fe_xO$ on the iron foil 140 (or a similar oxide when another metal is employed in place of the iron). The amount of the oxide layer is increased by the passage of oxygen ions through the solid electrolyte 136 when probe 126 is immersed. I have found that the amount of oxide thus formed within the envelope 128 is sufficient to attain an equilibrium and reproducible e.m.f. reading. The addition of a more noble but oxidizable dissimilar metal to the reference foil or member 140 likewise shifts the calibrational e.m.f. curve as shown in FIG. 6. For example a disc 140 formed from nichrome shifts the calibration curve to the left relative to the curve for a pure chromium disc 140, after the manner illustrated in FIG. 6.

In order to reuse the supporting tube 132 a layer of protective cardboard 152 surrounds the outer surfaces of that part of the tubing 132 which may be immersed in the molten metal bath or the like. The exposed surface 154 of the electrolyte 136 is protected during its passage through any slag or other overlying layer on the bath or heat by means of a suitably shaped cap 156, which can frictionally engage the adjacent end of the cardboard layer 152. For use with molten steels the cap 156 can be fabricated from a mild steel which is quickly melted to expose the electrolyte surface 154 at some point or predetermined location beneath the surface of the steel bath.

As mentioned in certain of the preceding figures, it will be understood, of course, that a second lead (not shown in FIG. 7) can be introduced into the insulating tube 128 for the purpose of making a thermocouple connection at the platinum foil or disc 144. It is also contemplated that the oxidizable foil 140 can be replaced with a mixed metal or alloy member such as a piece of nichrome. As set forth in FIG. 6, I have found that the use of a nichrome foil displaces the e.m.f. calibration curve to a more favorable position (curve 122) relative to that obtained with chromium (curve 118). Similar alloys can be employed in place of the foil 140 to displace the various calibration curves more or less at will.

In construction of the probe 126 of FIG. 7 it is not necessary that the foil 140 be sufficiently refractory to withstand melting at the operating temperatures of the probe 126. For example, I have obtained equally good results from the use of a pure iron foil 140 or similar metal which melts within the operating temperature range of most liquid steels is attained. For this reason, the foil or other oxidizable metallic member 140 can be provided in the form of particulate or pulverulent material.

Carbon or graphite can be substituted for the oxygen-reference means 140 after the teaching of FIG. 8. It is also contemplated that a suitable electrically conductive and self-contained oxygen reference material such as s cermet, can be substituted for the metallic member 140. The cermet, which can be selected from those materials enumerated or characterized in connection with FIG. 6, is provided as a suitable member or mass positioned against and hence in electrical contact with the solid electrolyte mass 52. The cermet, for this purpose, therefore can be provided in the form of a foil or other discreet member, or as a pulverulent mass. Either form may be pressed against the solid electrolyte 52, as by use of the contact foil or disc 144 or similar contact, or, operating conditions permitting, by gravity. Where the mass of reference material 140 is a discreet member and is sufficiently refractory to withstand melting at the anticipated operating temperatures the contact member 144 can be omitted and electrical contact made directly to the reference member 140.

Figure 9:
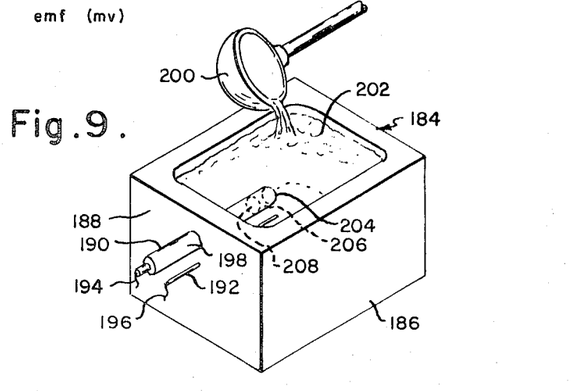
FIG. 9 is an isometric view of still another form of my direct oxygen measurement apparatus.

In FIG. 8 I provide convenient means for generating carbon dioxide ($CO_2$) within the probe structure as an oxygen-reference material. The desirability of using $CO_2$ has been established in connection with FIG. 6. The probe structure 158, as in the case of the structure 128 of FIG. 7, can be employed as part of the measuring apparatus 126 or 126' (FIGS. 8 and 9). The probe support 126 may be plunged manually into the molten steel bath or the like, with the provision of a probe support 126 of suitable length for example as used in connection with a conventional immersion thermocouple. It is also contemplated that the emersion gun structure FIGS. 4 and 5 can be used.

With more particular reference to FIG. 8 the solid electrolyte 136' is supported in insulating tube 138' in the manner described previously. Electrical contact is established with the inner surface 142' of the electrolyte 136' by means of a conductive wire lead 162 or the like. Electrical contact between the wire lead 162 and the electrolyte surface 142' can be established as shown in FIG. 1. However, I have found, in most cases, that the platinum or other metallic coating can be omitted from the surface 142', and adequate electrical contact can be made between the electrical lead and the electrolyte by merely pressing these components together. In one arrangement, this is accomplished, by forming an enlarged contact portion 164 adjacent the inner end of the lead 162. An inner insulating tube 166 is then furnished for the purpose of engaging and pressing the spiral 164 into firm contact with the electrolyte surface 142'. Alternatively, the lead is simply bent over the inward end of the inner tube 166. This engagement is preserved by securing the adjacent surface of the inner tube 166 to the other end of the probe tube 138' by means of a refractory cement 168.

In further accordance with my disclosure of FIG. 8 I provide a solid oxygen reference material 174 preferably within the space 172 between the inner or lead supporting tube 166 and the outer electrolyte supporting tube 138'. The material 174 is conveniently coated on the outer surfaces of the inner tube 166 and is capable of releasing an oxygen reference gas at elevated temperatures for the proper operation of the electrolyte cell 136'. As an example of such material 174 I use magnesium carbonate ($MgCO_3$) or manganese carbonate ($MnCO_2$), or preferably calcium carbonate ($CaCO_3$), which decompose to release carbon dioxide ($CO_2$) at the respective operating temperatures of the probe 158. In this arrangement, the outer end 170 of the inner tube 166 is left open. As the material 174 decomposes, the liberated $CO_2$ or other oxygen reference gas travels toward the electrolyte 136' and comes into intimate contact with the inner surface 142' thereof, owing to the close proximity of the inner end 176 of the inner tube 166. For use in measuring the dissolved oxygen content of liquid steels the inner insulating tube 166 desirably is fabricated from fused silica or quartz as is the electrolyte supporting tube 138'. Although the probe structure 158 is not completely sealed, it possesses the advantage of producing a very quick, equalibrium reading, owing to the copious supply of $CO_2$ from the decomposition of the rather limited quantity of material 174. A more obvious advantage is, of course, the elimination of an external source of $CO_2$ and its attendant conduit connections, metering valves, etc.

Another novel arrangement of my direct oxygen measuring apparatus 184 is shown in FIG. 9. The apparatus includes a refractory mold structure 186 through a wall section 188 of which are inserted an oxygen probe 190 and electrode 192. The probe 190 can be constructed in accordance with the insulating tube and electrolyte assembly shown in any of the preceding figures. Desirably the probe 190 is one of the self-contained probe structures 128, 158, or 160 of FIGS. 8–10 for ready portability of the measuring apparatus 184. Suitable electric leads 194, 196 are connected to the probe 190 and to the exterior electrode 196 and thence to external e.m.f. measuring circuitry (not shown) of known construction. Although the material of the mold 186 is of an insulating character it is not necessary, of course, to provide any particular means of insulating the electrode 192 from the probe structure 190, owing to the use of an insulating supporting tube 198.

In the operation of the direct measuring apparatus 184 a quantity of molten steel or other material is poured into the mold 186 from a suitable ladle or spoon 200. The mold 186 is filled until the surface 202 of the molten material covers the probe 190 and the electrode 192. Electrical contact is established with the outer surface 204 of the solid electrolyte mass 206 through the molten steel 202 or the like and the external electrode 192. On the other hand, the inner surface 208 of the electrolyte mass 206 is contacted by means of the electrical lead 194. As noted below respecting FIG. 12 a thermocouple can be associated with the probe 190 in FIG. 11.

In FIG. 10 another modification 210 of my novel direct measuring apparatus for dissolved oxygen is disclosed. In this arrangement by apparatus is incorporated in a tundish 212 of a continuous casting machine, or in other suitable container structure, and is thereby enabled to perform a continuous monitoring of the oxygen content in the liquid steel passing through the tundish. Specifically I provide a stabilized zirconia ($CaOZrO_2$) insert 214 for one or more of the nozzle openings such as the opening 216 of the tundish 212. One of the other solid electrolyte materials listed above can be substituted for the stabilized zirconia, provided its melting or softening point is above the anticipated temperature of the liquid steel.

The electrolyte insert 214 is contacted with an external measuring circuit and with an oxygen reference material to complete the electrolyte cell established by the insert 214. One arrangement for establishing such contact includes the provision of an insulating tube 218 extended through a conventional refractory wall structure 220 of the tundish 212. In this arrangement, a pair of electric leads 222 are extended through the insulating tube 218 and terminate in a thermocouple connection 224, which in turn is closely fitted into an adjacent recess 226 of the electrolyte insert 214 for electrical and thermal contact therewith. Alternatively, the thermocouple can simply be pressed against the bottom of the tube recess 227 in the insert 214.

Suitable oxygen reference material such as air or $CO_2$ from a suitable external source (not shown) can be conducted through the insulating tube 218 as denoted by flow arrow 228 to the inner end 230 of the insulating tube 218 where the reference gas contacts the adjacent surface of the electrolyte insert 214. The reference gas can then be conducted out of the insulating tube 218 through an inner tube 232 surrounding the leads 222. As noted below, other oxygen means can be substituted.

Electrical contact with the inner surface or throat 234 of the electrolyte insert 214 is established through the liquid steel in the tundish 212 and through any metallic component of the continuous casting machine which is in contact with the liquid steel. To facilitate such contact an external electrode 236 can be sealed through the wall structure 220 of the tundish 212 or inserted directly into the liquid metal through the open top of the tundish.

With this arrangement an oxygen reference material can be continuously supplied to one side of the electrolyte insert 214 and a material of unknown oxygen content to the other side. The e.m.f. developed thereacross is continuously monitored by measuring the potential developed across external electrode lead 238 and one of the thermocouple leads 222. Owing to the rapid response of the direct measuring apparatus 210, a continuous reading of the dissolved oxygen content of the liquid metal passing through the electrolyte insert 214 can be obtained. Such readings can be calibrated against any changes of temperature, which are of course continuously indicated by the thermocouple 224. It will be appreciated that other suitable oxygen-reference means, such as one of those described above, can be substituted depending upon the specific application of the invention.

Figure 11:
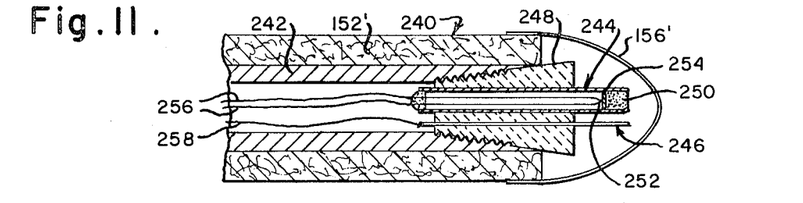
FIG. 11 is a partial longitudinally sectioned view similar to FIG. 8 and showing a modified probe structure.

In FIG. 11 of the drawings is disclosed another form 240 of my novel probe structure which can be immersed or submerged below the surface of a liquid metal bath for simultaneously measuring the temperature and the dissolved oxygen content of the metal bath. The supporting tubing 242 as noted above in connection with FIG. 8 can be of any desired length for insertion manually lance-wise or with an ejection device into the metal bath. The tube 242 is protected in this example by a cardboard jacket 152' to which is fitted a protective cap 156'. A direct reading oxygen probe 244 and an external electrode 246 such as a steel rod are inserted through suitable openings therefor in a plug 248. In this example the plug 248 can be secured to the end of the supporting tube 242 after the manner of FIG. 8.

A mass of electrolyte 250 is maintained within the exposed end of the insulating envelope 244 as described previously. The probe structure 244 can be fabricated as described in connection with any of the preceding figures, and in this example, is provided with a thermocouple 252 positioned against an oxygen reference member 254 and the inside surface of the mass 250. Thermocouple and electrolyte leads 256 are extended through suitable passages in the inner tube 254. As in other figures of the drawings, the refractory cement at the end of the envelope 244 merely stabilizes the leads 256 but does not seal the envelope. A similar lead 258 is connected to the external electrode 246, and all of the leads 256, 258 are extended through the supporting tube 242 for connection to external e.m.f. measuring circuitry (not shown). With the arrangement of FIG. 11 both the probe structure 244 and the external electrode 246 can be immersed beneath the surface of a liquid metal bath to the same predetermined depth, for measuring the dissolved oxygen content at that location. Substantially at the same time, the temperature at that location can be measured through the thermocouple 252.

Figure 12:
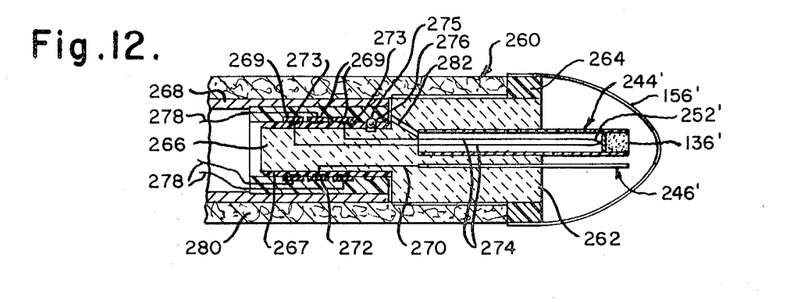
FIG. 12 is a similar view of still another form of my probe structure.

A similar immersion and direct-reading probe 260 is shown in FIG. 14. In this arrangement the probe 244' and external electrode 246' are supported by a refractory block or plug 262. As noted previously the cap 156 or 156' can be used to prevent contact of the probe 244' with any overlying slag. By the same token, the cap 156 or 156' can be employed to prevent contact with the liquid metal until the forward ends of the probe and electrode can be immersed to a predetermined depth below the surface of the liquid metal.

In this example the refractory block 262 is provided with a necked down portion 266 covered with an insulating layer 267 to which is secured an elongated supporting tube 268. Desirably, the supporting tube 268 is fabricated from a suitable structural material and is provided with longitudinally spaced commutator rings 269. The external electrode 246 is connected through lead 270 to contact 272 extending through the insulating layer 267, which can be of polyvinyl acetyl or the like for engagement with one of the commutator rings 269.

A pair of additional leads 274 for the thermocouple 252' are extended through the plug 262 to similar contacts 273 which are longitudinally spaced along the plug neck 266 for respective engagement with the remainder of the commutator rings 269.

The plug 262, together with the probe 244' and electrode 246', can be snapped into the supporting tube 268 by groove and detent means 275, 276. When thus engaged, the contacts 272, 273 are respectively engaged with the commutator rings 269, irrespective of the rotated position of the plug relative to the supporting tube 268. The rings 269 are connected to the supporting tube 268. The rings 269 are connected to suitable leads 278 extended through the supporting tube 268. At least the forward end of the tube 268 is afforded a protective layer 280 of cardboard or the like.

A suitable vent 282 is provided to relieve the gas pressure when the probe 260 is immersed in a high-temperature liquid metal.

From the foregoing it will be apparent that novel and efficient forms of methods and means for determining oxygen content of materials have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. A method for determining the dissolved oxygen content of liquid steel, said method comprising the steps of plunging a probe containing an oxygen-anion permeable solid electrolyte material into said liquid steel without destructive thermal shock, said probe comprising an elongated electrically insulating refractory envelope, a small mass of said solid electrolyte material supported closely adjacent one end of said envelope, said mass being of sufficiently small size as to be capable of withstanding thermal shock upon contacting said liquid steel, at least a portion of one side of said mass being exposed through a relatively small opening in said envelope for contact with said liquid steel, said one side portion being disposed closely adjacent said one envelope end, contacting an apposed side of said mass within said envelope with an oxygen-reference material, said probe having circuit means extending into said envelope for electrically contacting said apposed mass side and additional means disposed for electrically contacting said liquid steel, and measuring an e.m.f. developed across said mass for correlation with said oxygen content.

2. The method according to claim 1 including the additional step of measuring the temperature of said liquid steel for correlation with said e.m.f.

3. The method according to claim 109 wherein the temperature is measured at said apposed mass side.

4. The method according to claim 1 wherein said probe is inserted through a wall of a mold capable of containing a quantity of said liquid steel, and said plunging step is accomplished by pouring said quantity into said mold.

5. The method according to claim 4 including the additional step of measuring the temperature of said liquid steel quantity for correlation with said e.m.f.

6. The method according to claim 5 wherein the temperature is measured at said apposed mass side.

7. The method according to claim 1 including the additional step of placing a protective cap over said mass and said envelope end prior to said plunging step.

8. The method according to claim 1 including the additional steps of mounting said probe on an elongated support, and insulating said support to protect said support from said liquid steel and from an overlying slag layer.

9. The method according to claim 1 including the additional step of detachably mounting said probe on an elongated support so that a used probe on said support is replaceable with an unused probe to be mounted on said support.

* * * * *

UNITED STATES PATENT OFFICE
CERTIFICATE OF CORRECTION

Patent No. 3,619,381     Dated November 9, 1971

Inventor(s) George R. Fitterer

It is certified that error appears in the above-identified patent and that said Letters Patent are hereby corrected as shown below:

Column 1, line 10, "instantaneously" should read -- instantaneous --; line 20, "aces" should read -- case --; and line 65, "suitable" should read -- suitably --.

Column 6, line 73, "therewith" should read -- therewithin --.

Column 7, line 72, "approximately" should read -- approximated --.

Column 8, Table 1 (right hand column, Type 1) after "$CuCr_2O_4$" insert an asterisk (*); and line 72 "which" should read -- with --.

Column 9, line 15, delete "or" before "described".

Column 10, line 7, insert -- the -- after "when" and line 52, "s" should read -- a --.

Column 10, line 72, "8 and 9" should read -- 7 and 8 --.

Column 11, line 2, insert -- of -- before "FIGS.".

Column 12, line 7, "by" should read -- my --; and line 12, "$CaOZrO_2$" should read -- CaO $ZrO_2$ --.

Column 13, line 24, "14" should read -- 12 --; and lines 51 and 52, delete "The rings 269 are connected to the supporting tube 268.".

Column 14, line 3, insert a comma (,) after "foregoing"; and line 35, "109" should read -- 2 --.

Signed and sealed this 16th day of May 1972.

(SEAL)
Attest:

EDWARD M. FLETCHER, JR.
Attesting Officer

ROBERT GOTTSCHALK
Commissioner of Patents